United States Patent
Kusaka

[11] Patent Number: 5,166,722
[45] Date of Patent: Nov. 24, 1992

[54] CAMERA IMAGE SHAKE DETECTING APPARATUS

[75] Inventor: Yosuke Kusaka, Yokohama, Japan
[73] Assignee: Nikon Corporation, Tokyo, Japan
[21] Appl. No.: 743,507
[22] Filed: Aug. 9, 1991

[30] Foreign Application Priority Data

| Aug. 14, 1990 | [JP] | Japan | 2-215228 |
| Aug. 28, 1990 | [JP] | Japan | 2-225598 |
| Sep. 13, 1990 | [JP] | Japan | 2-241275 |

[51] Int. Cl.⁵ .................. G03B 7/00; G03B 13/36; G03B 17/18
[52] U.S. Cl. .................. 354/408; 354/430; 354/456; 354/465
[58] Field of Search ........... 354/430, 402, 406, 407, 354/408, 409, 465, 471, 456, 289.1, 289.12

[56] References Cited

U.S. PATENT DOCUMENTS

| 4,492,452 | 1/1985 | Suzuki et al. | 354/430 |
| 4,512,646 | 4/1985 | Kitaura et al. | 354/409 |
| 4,527,053 | 7/1985 | Kinoshita et al. | 354/406 X |
| 4,673,276 | 6/1987 | Yoshida et al. | 354/430 |
| 4,709,138 | 11/1987 | Suda et al. | 354/408 X |
| 4,733,264 | 3/1988 | Hatase et al. | 354/430 |
| 4,772,117 | 9/1988 | Matsui | 354/402 |
| 5,034,768 | 7/1991 | Miyadera | 354/400 |

FOREIGN PATENT DOCUMENTS

60-166911 8/1985 Japan.

Primary Examiner—W. B. Perkey
Attorney, Agent, or Firm—Shapiro and Shapiro

[57] ABSTRACT

A camera image shake detecting apparatus comprises a photographing optical system, a photoelectric converting device for having a pair of light receiving portions consisting of a plurality of light receiving elements and generating at least twice at a predetermined timing a pair of the object image signals corresponding to the light intensity distribution of the object image formed on the light receiving portions, a focus detecting optical system for forming the object image on the pair of light receiving portions of the photoelectric converting device by means of light flux passing through the photographing optical system, a focus detect calculating device for detecting a state of focus adjustment of the photographing optical system on the basis of the pair of the object image signals generated by the photoelectric converting device, an adding device for calculating the synthetic object signal by adding a pair of the object image signals generated by the photoelectric converting device, a memory device for memorizing the synthetic object image signal, and an amount of image shake detecting device for detecting an amount of image shake on the basis of the amount of relative displacement between the previous synthetic object image signal stored in the memory device and the subsequent synthetic object image signal calculated by the adding device.

42 Claims, 12 Drawing Sheets

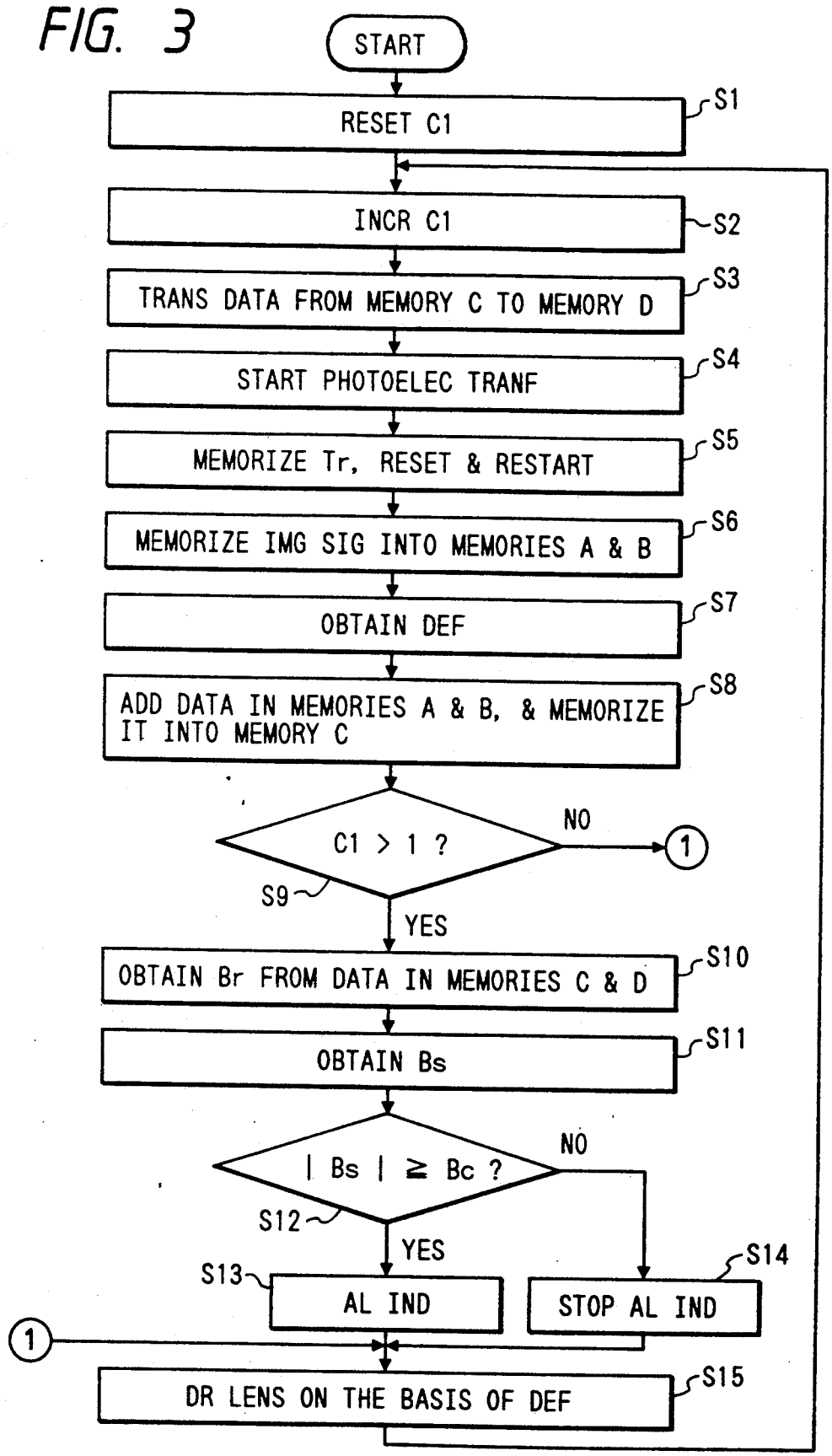

FIG. 5A
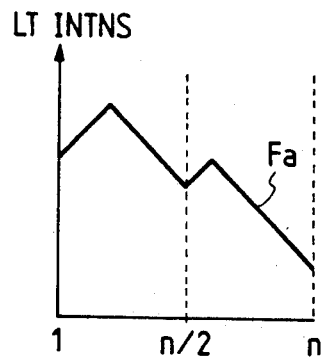
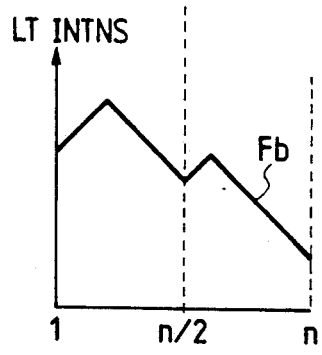
FIG. 5B
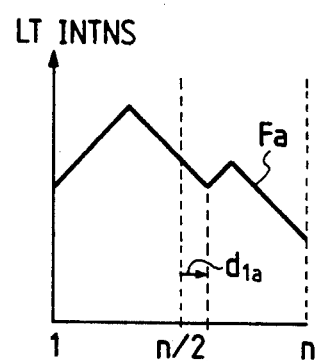
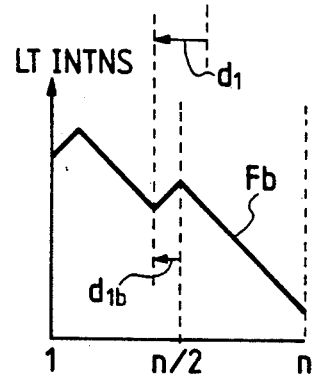
FIG. 5C
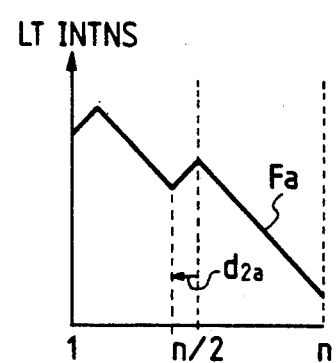
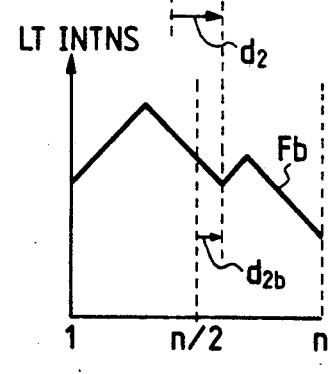

CAMERA IMAGE SHAKE DETECTING APPARATUS

BACKGROUND OF THE INVENTION

1. Field of the Invention

This invention relates to a camera image shake detecting apparatus for detecting an image shake by using the output signal from an image sensor provided to detect a camera focus.

2. Related Background Art

An image shake detecting apparatus for detecting an image shake by using the image signal of an object for photographing generated by a photoelectric converter of a focus detecting apparatus has been known (for example, see Japanese Patent Laid-Open No. 60-166911).

FIGS. 4A to 4C are views showing a state of detecting a focus by a conventional focus detecting apparatus. FIGS. 5A to 5C are views typically showing an image signal of an object for photographing to be detected by a photoelectric converter (image sensor) of the focus detecting apparatus. The conventional focus detecting apparatus will be described referring to FIGS. 4A to 5C.

The images of an object for photographing generated by light flux, which has passed through two different pupil areas of a photographing lens 1, are formed on two photoelectric converters 3a and 3b consisting of n p'cs of light receiving elements each through reimage forming lenses 2a and 2b to obtain a pair of image signals Fa and Fb of the object for photographing, shown in FIGS. 5A to 5C, corresponding to the light intensity distribution of the object image by photoelectrically converting by the photoelectric converters 3a and 3b.

FIG. 4A shows a focused state in which the image of the object obtained by the photographing lens 1 is formed on a predetermined focus surface 4 conjugate to the film surface. FIG. 4B shows a so-called "front focus state" in which the image is formed in front of the predetermined focus surface 4. FIG. 4C shows a so-called "rear focus state" in which the image is formed behind the predetermined focus surface 4.

During focusing as shown in FIG. 4A, a pair of images of the oject are formed at the same position on the photoelectric converters 3a and 3b, and an amount of relative displacement d (hereinafter called an "amount of relative displacement d for detecting the focus", and this is distinguished from an amount of relative displacement d' for detecting the image shake as mentioned later) between two image signals Fa and Fb of the object as shown in FIG. 5A is 0.

On the other hand, in the front focus state shown in FIG. 4B, a pair of images of the object on the photoelectric converters 3a and 3b are displaced by d1a and d1b respectively, whereby image signals Fa and Fb of the object are displaced by an amount of relative displacement d1 for detecting the focus corresponding to a sum (d1a+d1b) of displacements of each object image as shown in FIG. 5B.

Similarly, in the rear focus state shown in FIG. 4C, a pair of images of the object on the photoelectric converters 3a and 3b are displaced by d2a and d2b respectively, whereby image signals Fa and Fb of the object are displaced by an amount of relative displacement d2 for detecting the focus corresponding to a sum (d2a+d2b) of displacements of each object image as shown in FIG. 5C.

The focus detecting apparatus thus detects the focus detecting state of the photographing lens 1 by detecting the amount of relative displacement d for detecting the focus for a pair of image signals Fa and Fb of the object.

Then a method for calculating an amount of relative displacement d for detecting the focus will be described.

Assuming data for a pair of image signals Fa and Fb of the object obtained from the photoelectric converters 3a and 3b to be ap and bp (p=1 to n) respectively, the amount of correlation C (L) is obtained by correlation calculation shown in equation (1).

$$C(L) = \sum_i |a(i + L) - b(i)| \quad (1)$$

where L is an integral number, and is an amount of relative displacement of a pair of image signals of the object in which a pitch of the light receiving element is used as units. Also, a range of parameter i is appropriately determined in accordance with the amount of displacement L and the number of light receiving element n.

The calculation result of equation (1) is that an amount of correlation C (L) is minimal at an amount of displacement L=kj with high correlation data.

Then using the three-point interpolation technique in equation (2), a minimum value C (L) min=C (d) for a continuous amount of correlation is obtained.

$$d = kj + D/SLOP \quad (2)$$

$$C(km) = C(kj) - |D|$$

$$D = \{C(kj - 1) - C(kj + 1)\}/2$$

$$SLOP = \text{MAX}\{C(kj + 1) - C(kj), C(kj - 1) - C(kj)\}$$

The amount of defocus DEF in proportion to a distance between the image surface of the object on the photographing lens 1 and the predetermined focus surface conjugate to the film surface can be obtained from the amount of relative displacement d for detecting the focus obtained from the equation (2) by using equation (3).

$$DEF = KX \cdot PY \cdot d \quad (3)$$

where PY is a pitch in the arranging direction of the light receiving elements constituting each light receiving portion of the photoelectric converters 3a and 3b. KX is a coefficient which is determined by the construction of the focus detecting optical system.

By obtaining an amount of driving for the photographing lens 1 from this amount of defocus DEF, the photographing lens 1 is driven by the lens driving portion for focusing.

Then a conventional image shake detecting apparatus will be described.

When the focus is detected again and it is judged to be in a focused state after the photographing lens 1 is driven for focusing on the basis of the amount of defocus DEF calculated by the focus detecting device as mentioned above, the image signal of the object Fa is gathered twice at a time interval from one side of the photoelectric converter for detecting the focus, for example, 3a. At this time, the image signal Fb of the object from the photoelectric converter 3b may be used.

Assuming the object image signal for the last time of the photoelectric converter 3a to be Fa' and the object image signal for this time to be Fa respectively as shown in FIG. 6, the amount of relative displacement between these object image signals for the last time and this time Fa' and Fa is obtained by using the above-mentioned equations (1) and (2).

Although the object image signals Fa' and Fa gathered after focusing should be essentially at the same position, an amount of relative displacement in proportion to the amount of shake, that is, an amount of relative displacement d' for detecting the image shake as shown in FIG. 6 is detected should there be an image shake.

A conventional image shake detecting apparatus gives a warning about shake or changes the shutter speed not to cause any image shake in accordance with the amount of relative displacement d' for detecting the image shake.

In the conventional image shake detecting apparatus, however, since a shake is detected by detecting the temporal displacement in the object image signal of one side of the photoelectric converter for detecting the focus, the state of focusing changes, and this causes a change in the position of the object image, causing an error in the shake detection when the photographing lens is driven while the shake is being detected. Therefore, the shake should be always detected while the lens is not driven, that is, after focusing is performed and driving of the lens is stopped. For this reason, there is a problem that a shake cannot be detected while the lens is being driven for focusing.

Especially, in so-called "chase driving mode", which detects the focus by chasing a moving object for photographing and always drives the photographing lens on the basis of the focus detecting result, it becomes impossible to detect any image shake because the process enters a focused state or a nonfocused state.

Also in so-called "single mode" or "one shot servo mode", in which the lens is not driven after focusing, "mirror up" and exposure cannot be performed immediately after focusing because an image shake has to be detected after focusing, and the response during shutter release is inferior.

In a focus detecting device for calculating the amount of defocus of a photographing optical system by forming a pair of an image of the object for photographing on photoelectric converting means from a pair of light flux passing through the photographing optical system by means of the so-called "pupil division system" focus detecting optical system, obtaining the object image signal by photoelectrically converting this object image by the photoelectric converting means, and performing a predetermined calculation for this object image signal, an image shake detecting apparatus for detecting an image shake by using the object image signal generated by the photoelectric converting means in the focus detecting device has been proposed in, for example, Japanese Patent Laid-Open No. 166911.

In the image shake detection, an amount of relative displacement d for one side of image signals (Fa, Fa' or Fb, Fb') which are temporally different as shown in FIGS. 18A and 18B, is obtained through the difference type correlating algorithm of the same equations (1) and (2) as the above-mentioned focus detecting calculation by using photoelectric converting means 3 for detecting the focus after judging it as focused due to the above-mentioned focus detection.

For example, assuming the data of the object image signals Fa and Fa' to be a(p) and e(p) (however p=1 to n), an amount of correlation C (L) is obtained through the difference type correlating algorithm shown in equation (4) similar to equation (1).

$$C(L) = \sum_i |a(i + L) - e(i)| \qquad (4)$$

where L in equation (4) is an integral number, and is an amount of relative displacement in which a pitch of light receiving element for a pair of light receiving element output data is used as an unit.

The calculation result of equation (4) is that an amount of correlation C (L) is minimal at an amount of shift L=kj with high correlation data. Then using the three-point interpolation technique in the same equation (5) as equation (2), an amount of relative displacement, which gives a minimum value C (L) min=C (d) for a continuous amount of correlation, is obtained.

$$d = kj + D/SLOP \qquad (5)$$

$$C(d) = C(kj) - |D|$$

$$D = \{C(kj - 1) - C(kj + 1)\}/2$$

$$SLOP = \text{MAX}\{C(kj + 1) - C(kj), C(kj - 1) - C(kj)\}$$

The amount of relative displacement d obtained from equation (5) is an amount of image shake Br, and a warning about shake has been given or the shutter speed has been changed not to cause the image shake in accordance with the amount of image shake Br.

In an image shake detecting apparatus using such a conventional pupil division system focus detecting device, there was a problem at issue that the image shake detection malfunctions when the output level for the object image signal varies at a different time. That is, when an image shake is detected for an object for photographing lighted by a light source, the brightness of which varies with time like a fluorescent lighting, the output level of the object image signal occurring at a different time differs as shown in FIGS. 19A and 19B even if the charge accumulation time of the photoelectric converting means is the same.

In this case, there is a relationship shown in equation (6) between one side of the object image signals Fa=G(x) and Fa'=H(x) (x represents the position of the light receiving portion of the photoelectric converting means in the arranging direction) at times T=T1 and T=T2.

$$H(x) = M \times G(x + Br) \qquad (6)$$

In equation (6), M is a coefficient showing the output fluctuation, and M is M=1 when there is no fluctuations. Also Br is an amount of image shake between time T1 and time T2. When the coefficient M=1, a minimum value for the amount of correlation C (L) obtained through the difference type algorithm becomes almost zero as shown in FIG. 13A, and the amount of image shake Br can be correctly obtained by using the three-point interpolation technique in equation (5). When the coefficient M is not 1, a minimum value for the amount of relative correlation C (L) obtained through the difference type algorithm shown in equation (4) greatly rises from zero as shown in FIG. 13B, and the amount of image shake obtained by the three-point-interpolation technique in equation (5) has an error against the correct amount of image shake Br.

SUMMARY OF THE INVENTION

It is an object of the present invention to provide a camera image shake detecting apparatus capable of detecting an image shake during nonfocusing or even while a photographing lens is being driven.

It is another object of the present invention to provide an image shake detecting apparatus capable of eliminating a detection error in amount of image shake due to a difference in the output level of an image signal of an object for photographing.

Referring to FIG. 1 showing an embodiment, the present invention is applied to a camera image shake detecting apparatus comprising a photographing optical system 1, photoelectric converting means 3a and 3b for having a pair of light receiving portions consisting of a plurality of light receiving elements and intermittently generating a pair of the object image signals corresponding to the light intensity distribution of the object image on these light receiving portions, focus detecting optical systems 2a and 2b for forming the object image on a pair of light receiving portions of the photoelectric converting means 3a and 3b by means of light flux passing through the photographing optical system 1, focus detect calculating means 5a for detecting a state of focus adjustment of the photographing optical system 1 on the basis of a pair of the object image signals generated by the photoelectric converting means 3a and 3b, and driving means 6 for driving the photographing optical system 1 so that a pair of the object image signals coincide with each other on the basis of the detection result of the focus detect calculating means 5a.

The above-mentioned purpose can be accomplished by providing adding means 9a for calculating a synthetic object image signal by adding a pair of object image signals generated by the photoelectric converting means 3a and 3b, memory means D for storing the synthetic object image signal, and image detecting means 9b and 9c for detecting an image shake on the basis of an amount of relative displacement for detecting the image shake between the synthetic object image signal calculated by the adding means 9a and the synthetic object image signal for the last time stored in the memory means D.

The adding means 9a calculates the synthetic object image signal by adding a pair of the object image signals intermittently detected by the photoelectric converting means 3a and 3b, and the memory means D stores this synthetic object image signal. The image shake detecting means 9b and 9c detect the image shake on the basis of the amount of image shake between the synthetic object image signal calculated by the adding means 9a and the synthetic object image signal for the last time stored in the memory means D, that is, the amount of relative displacement for detecting the image shake.

In other words, since the object images obtained by driving the lens are displaced by the same amount in the opposite direction to each other in a pair of the object image signals, it is possible to obtain a synthetic object image signal, in which the displacement caused by drive of the lens has been offset, by adding a pair of the object image signals as mentioned above. Also it is possible to detect a correct shake even while the lens is being driven by detecting the amount of image displacement between the synthetic object image signals which are temporally different.

Referring to FIG. 7 showing another embodiment, the present invention is applied to a camera image shake detecting apparatus comprising a photographing optical system 1, photoelectric converting means 3a and 3b for having a pair of light receiving portions consisting of a plurality of lighting elements and intermittently generating a pair of the object image signals corresponding to the light intensity distribution of the object image on these light receiving portions, focus detecting optical systems 2a and 2b for forming the object image on the pair of light receiving portions of the photoelectric converting means 3a and 3b by means of light flux passing through the photographing optical system 1, focus detect calculating means 5a for detecting a state of focus adjustment of the photographing optical system 1 by obtaining an amount of relative displacement for detecting the focus of a pair of the object image signals generated by the photoelectric converting means 3a and 3b, and driving means 7 for driving the photographing optical system 1 so that a pair of the object image signals coincide with each other on the basis of the detection result of the focus detect calculating means 5a.

The above-mentioned purpose can be accomplished by providing first memory means B for storing the object image signal generated by one side of light receiving portion of the photoelectric converting means 3a and 3b, second memory means D for storing the amount of relative displacement for detecting the focus obtained by the focus detect calculating means 5a, relative displacement information detecting means 10 and 9a for detecting the relative displacement information for detecting the image shake on the basis of the object image signal generated by one side of light receiving portion of the photoelectric converting means 3a and 3b and the object image signal for the last time stored in the first memory means B, and image shake detecting means 10 and 9a for detecting the true image shake by detecting the relative displacement information of a pair of the object image signal attendant upon the movement of the photographing optical system 1 driven by driving means 7 on the basis of the amount of relative displacement for detecting the focus obtained by the focus detect calculating means 5a and the amount of relative displacement for detecting the focus for the last time stored in second memory means D, and by comparing the relative displacement information with the relative displacement information for detecting the image shake detected by the relative displacement information detecting means.

The image shake detecting means 10 and 9b in the camera image shake detecting apparatus detect the true image shake by deducting the amount of relative image displacement showing the relative displacement information attendant upon the movement of the photographing optical system 1 from the amount of image shake showing the relative displacement information for detecting the image shake detected by the relative displacement information detecting means 10 and 9a.

The first memory means B sequentially stores the object image signal intermittently generated by one side of light receiving portion of the photoelectric converting means 3a and 3b, and the second memory means D sequentially stores the amount of relative displacement for detecting the focus obtained by the focus detect calculating means 5a. Further, the relative displacement information detecting means 10 and 9a detect the relative displacement information for detecting the image shake between the object image signal generated by one side of light receiving portion of the photoelectric converting means 3a and 3b and the object image signal for the last time stored in the first memory means B.

The image shake detecting means 10 and 9b detect the relative displacement information on a pair of the object image signals attendant upon the movement of the photographing optical system 1 driven by the driving means 7 on the basis of the amount of relative displacement for detecting the focus obtained by the focus detect calculating means 5a and the amount of relative displacement for detecting the focus for the last time stored in the second memory means D, and detect the true image shake by comparing the relative displacement information with the relative displacement information for detecting the image shake detected by the relative displacement information detecting means.

In the camera image shake detecting apparatus, the image shake detecting means 10 and 9b detect the true image shake by deducting the amount of relative displacement showing the relative displacement information attendant upon the movement of the photographing optical system 1 from the amount of relative image displacement showing the relative displacement information for detecting the image shake detected by the relative displacement information detecting means 10 and 9a.

Although the figures of the embodiments were used for the sake of understanding, the present invention is not limited to the embodiments.

The image shake detecting apparatus according to the present invention further comprises: a photographing optical system for forming the image of the object for photographing on a predetermined focus surface; photoelectric converting means consisting of a plurality of light receiving elements having a pair of light receiving portions which generate the object image signal corresponding to the light intensity distribution on these light receiving elements; a focus detecting optical system forming, on a pair of the light receiving portions of the photoelectric converting means, the light intensity distribution corresponding to a pair of object images formed by light flux passing through a different pupil area of the photographing optical system; focus detect calculating means for obtaining, through the difference type algorithm, an amount of relative displacement of a pair of the object image signals generated by a pair of light receiving portions of the photoelectric converting means, and for detecting an amount of defocus for the predetermined focus surface on the object image surface of the photographing optical system on the basis of the amount of relative displacement; and image shake detect calculating means for obtaining, through the multiplication type algorithm, the amount of relative displacement of the object image signal generated by one side of the light receiving portion of the photoelectric converting means at a different time, and for detecting the amount of image shake of the object image formed by the photographing optical system on the basis of the amount of relative displacement.

In an image shake detecting apparatus using the pupil division system focus detecting device, a detection error in the amount of image shake due to a difference in the output level of the object image signal is eliminated by obtaining the amount of relative displacement of the object images which are temporally different through the multiplication type algorithm.

BRIEF DESCRIPTION OF THE DRAWINGS

FIG. 3 is a flow chart showing an image shake detecting operation;

FIGS. 4A, 4B and 4C show a focused state, front focus state and a rear focus state respectively;

FIGS. 5A to 5C are views showing an image signal for an object for photographing on a photoelectric converting apparatus for each focus detecting state shown in FIGS. 4A to 4C, and FIG. 5A, FIG. 5B and FIG. 5C show a focused state, a front focus state and a rear focus state respectively;

DETAILED DESCRIPTION OF THE PREFERRED EMBODIMENTS

Figure 1:
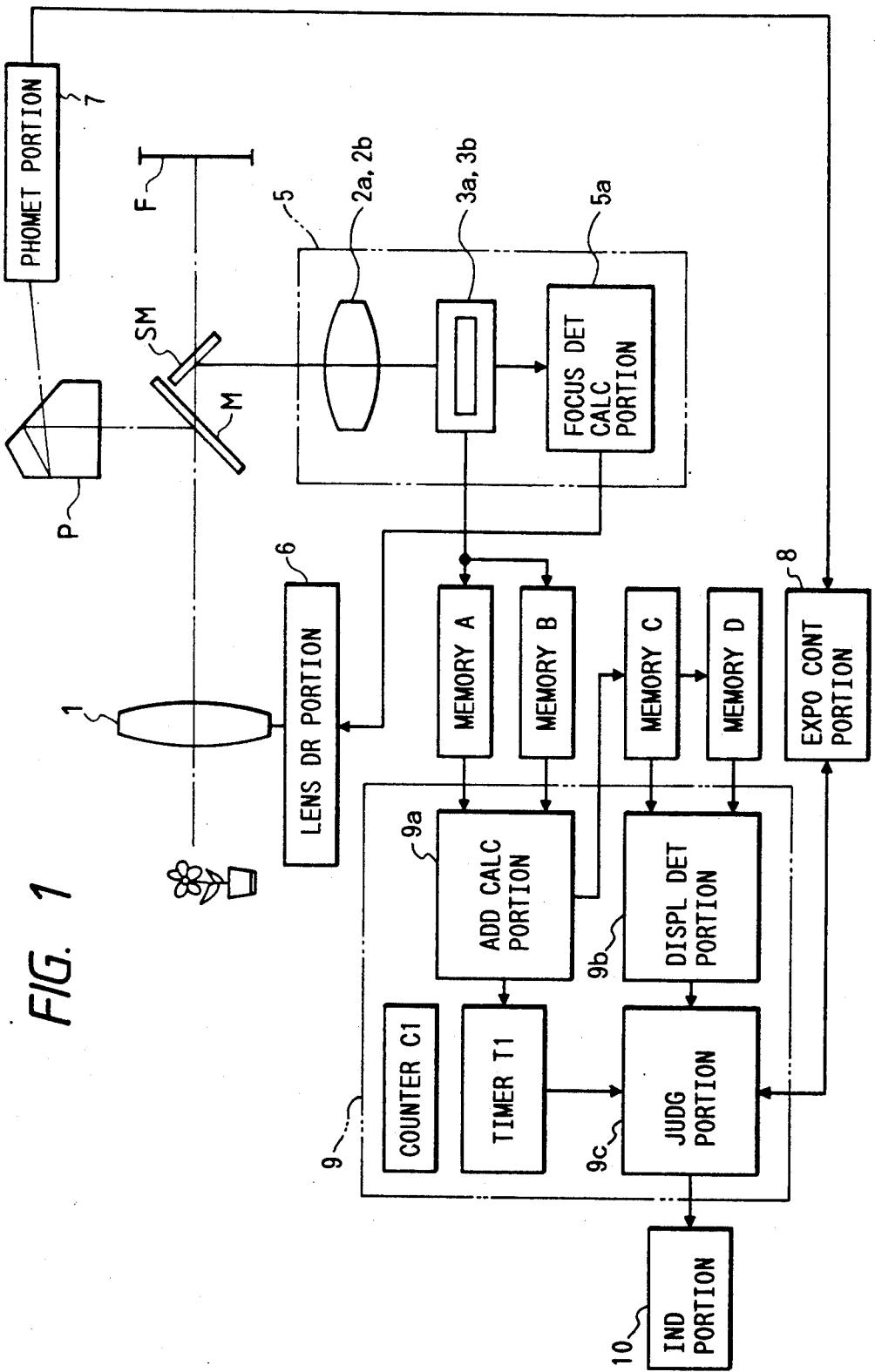
FIG. 1 is a block diagram showing an embodiment.

FIG. 1 is a block diagram showing an embodiment according to the present invention.

Light flux, which has passed through a photographing lens 1, passes through the central semitransparent portion of a main mirror M, and then is led to a focus detecting portion 5 by a submirror SM. Also a part of light flux, which has been reflected by the main mirror M, is led to a photometry portion 7 by a pentaprism P.

Figure 4A:
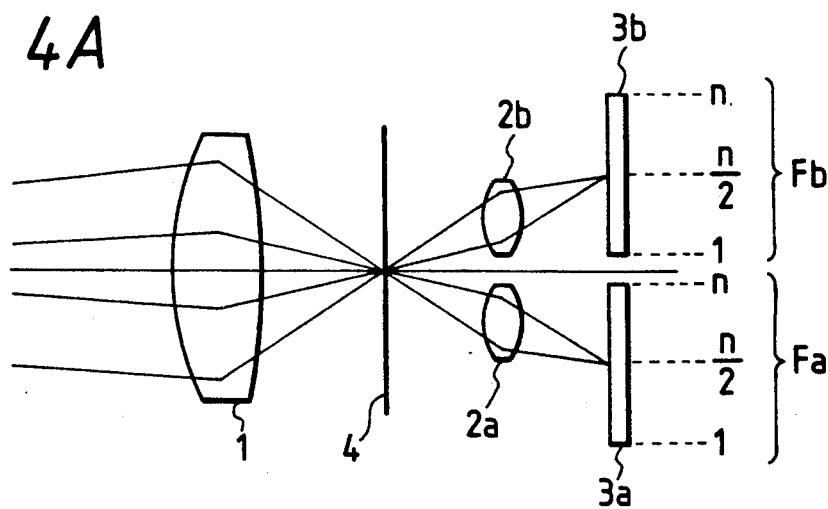
FIGS. 4A to 4C are views showing the focus detecting state of a focus detecting portion.
Figure 4B:
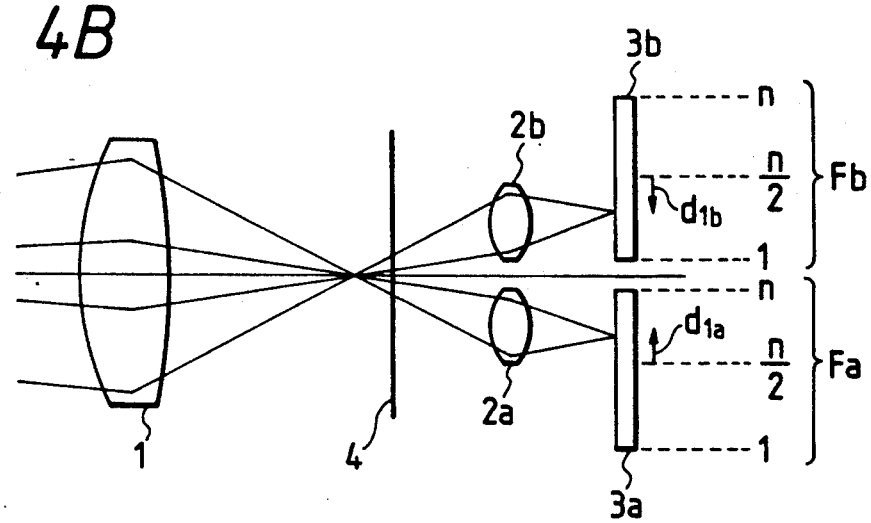

The focus detecting portion 5 is composed of reimage forming lenses 2a and 2b and photoelectric converters 3a and 3b as shown in the above FIGS. 4A and 4B, and a focus detect calculating portion 5a. The focus detect calculating portion 5a intermittently calculates an amount of defocus DEF on the basis of a pair of the object image signals Fa and Fb corresponding to the light intensity distribution for the object image on the photoelectric converters 3a and 3b as mentioned above to output to a lens driving portion 6. The lens driving portion 6 calculates an amount of driving for causing the object image surface on the photographing lens 1 to coincide with the film surface F on the basis of the amount of defocus DEF to drive the photographing lens 1 for focusing.

The photometry portion 7 detects the brightness information by metering the light in the photographing picture to output to an exposure control portion 8. The exposure control portion 8 calculates the shutter speed and iris diaphragm value on the basis of the brightness information to output the shutter speed Ts to an image shake detecting portion 9 as mentioned later, and to control the shutter and iris diaphragm mechanism (not shown).

Data memories A and B store a pair of the object image signals Fa and Fb to be intermittently detected by the photoelectric converters 3a and 3b. Whenever the object image signal is detected by the photoelectric converters 3a and 3b, memory A stores the object signal data Fa of the photoelectric converter 3a, and memory B stores the object image signal data Fb of the photoelectric converter 3b. Also data memories C and D store adding result Fc by an add calculating portion 9a as mentioned later. Whenever an add calculation is carried out, memory C transfers the add calculation data Fc' for the last time stored therein to memory D, and stores data Fc which has been newly add calculated this time. The memory D stores data Fc' for the last time transferred from the memory C.

An image shake detecting portion 9 is composed of an add calculating portion 9a, a displacement detecting portion 9b, a judging portion 9c, a timer T1 and a counter C1 to detect an image displacement.

The add calculating portion 9a adds a pair of the object image signal data Fa and Fb stored in memories A and B in accordance with equation (7) respectively to calculate a synthetic object image signal Fc.

$$cp = ap + bp \qquad (7)$$

where ap, bp and cp represent the object image data Fa, the object image data Fb and the synthetic object image data Fc respectively. Also p=1 to n.

FIGS. 2A to 2F show the synthetic object image signal Fc'(c) for the last time obtained by adding a pair of object image signals Fa'(a) and Fb'(b) for the last time, and the synthetic object image signal Fc(f) for this time obtained by adding a pair of object image signals Fa(d) and Fb(e) for this time.

Since FIGS. 2A to 2F show when the amount of image displacement for a pair of the object image is large, that is, when the amount of defocus is large for the sake of understanding, a considerable amount of difference is found in the light intensity distribution between the synthetic object image signals Fc and Fc'. Since, however, both the synthetic object image signals Fc and Fc' actually almost coincide with each other in the light intensity distribution in the vicinity of the focused point while the lens is being driven, the correct amount of relative displacement d' for detecting the image shake can be obtained.

Figure 2A:
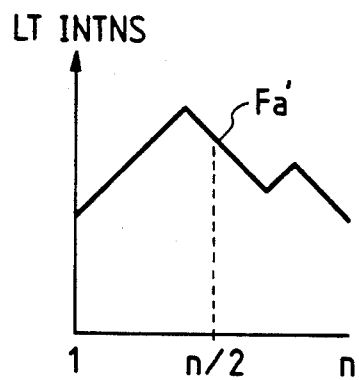
FIG. 2A is a view showing one side of a pair of image signals for an object for photographing for the last time.
Figure 2B:
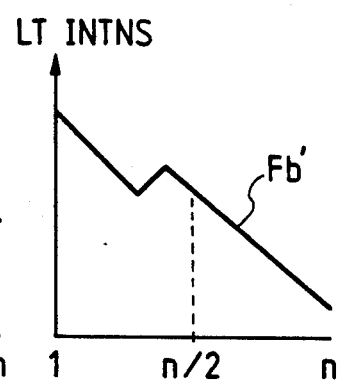
FIG. 2B is a view showing the other side of a pair of image signals for an object for photographing for the last time.
Figure 2C:
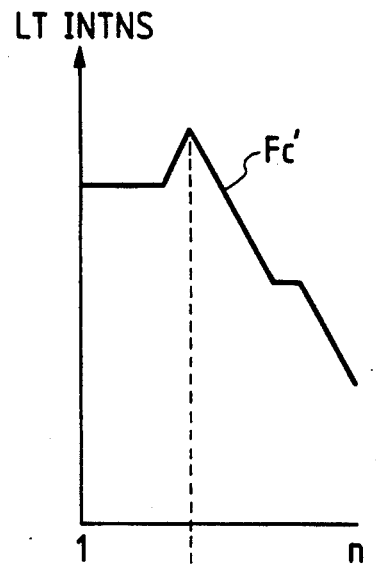
FIG. 2C is a view showing their synthetic object image signal.
Figure 2D:
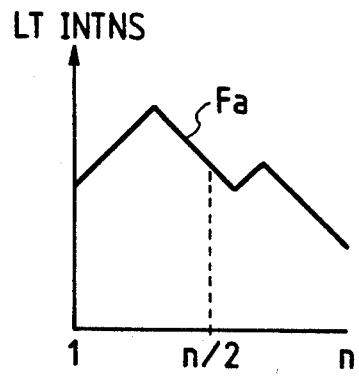
FIG. 2D is a view showing one side of a pair of image signals for an object for photographing for this time.
Figure 2E:
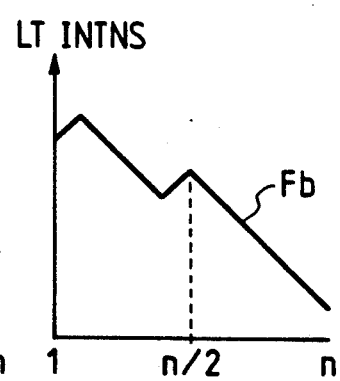
FIG. 2E is a view showing the other side of a pair of image signals for an object for photographing for this time.
Figure 2F:
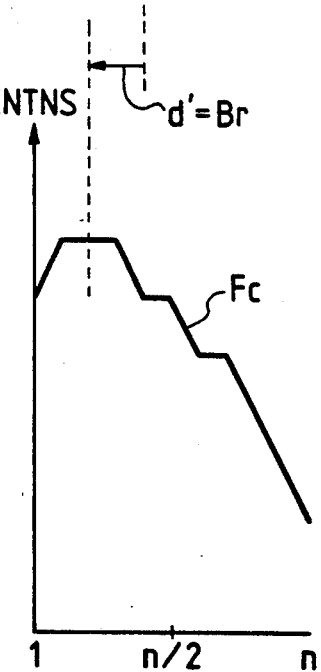
FIG. 2F is a view showing their synthetic object image signal.

A displacement detecting portion 9b is added by the add calculating portion 9a, and obtains the amount of relative image displacement d' for detecting the image shake between Fc' and Fc using the synthetic object image signal data for the last time and this time Fc' and Fc stored in the memories C and D in the same manner as the amount of relative image displacement d for detecting the focus obtained using the above-mentioned equations (1) and (2), that is, an amount of image shake Br shown in FIGS. 2C and 2F.

A timer T1 times a time interval Tr in which the add calculating portion 9a generates the synthetic object image signal data by adding the object signal data. Further, a counter C1 counts a number of detections of the synthetic object image signal Fc. A judging portion 9c obtains an amount of image shake Bx per unit time from the amount of image shake Br and the time interval Tr by using equation (8).

$$Bx = Br / Tr \qquad (8)$$

Further, an amount of image shake Bs, while the shutter is being opened, is obtained from the shutter speed Ts calculated by the exposure control portion 8 by using equation (9).

$$Bs = Bx \cdot Ts \qquad (9)$$

When $|Bs| \geq Bc$ as compared the amount of image shake Bs with a predetermined value Bc, an indicating portion 10 gives a warning.

When comparing the amount of image shake Bs obtained from equation (9) with a predetermined value Bc, a plurality of amounts of image shake Bs may be obtained within a predetermined time to calculate these statistical average values and compare with the predetermined value Bc.

FIG. 3 is a flow chart showing an operation when the focus detect calculating portion 5a and the image shake detecting portion 9 are composed of computers. Referring to this flow chart, the operation of an embodiment will be described.

In step S1, reset a counter C1, and proceed to step S2 to increment the counter C1. In step S3, the synthetic object image signal data Fc' for the last time stored in the memory C is transferred to the memory D for being stored. In step S4, cause the photoelectric converters 3a and 3b to start the photoelectric conversion, and in the next step S5, reset for restarting after causing the timer T1 to memorize a counting time Tr.

In step S6, memorize the object image signal from the photoelectric converter 3a into the memory A, and that from the photoelectric converter 3b into the memory B respectively. In step S7, obtain the amount of defocus DEF on the basis of a pair of the object image signals Fa and Fb from the photoelectric converters 3a and 3b as mentioned above, and further in step S8, obtain the synthetic object image signal Fc by adding the object image signal Fa stored in the memory A and the object image signal Fb stored in the memory B in accordance with the above-mentioned equation (7) and store in memory C.

In step S9, distinguish whether or not the value of counter C1 is greater than 1, that is, whether or not the synthetic object image signal has been calculated twice or more. If calculated twice or more, proceed to step S10, and if not, proceeed to step S15. In step S10, obtain the amount of image shake Br from the synthetic object image signal data Fc for this time stored in the memory C and the synthetic object signal data Fc' for the last time stored in the memory D. In step S11, obtain the amount of image shake Bs during time Ts while the shutter is being opened by using the above-mentioned equations (8) and (9), and in the following step S12, distinguish whether or not |Bs| ≧ Bc by comparing this amount of image shake Bs with a predetermined value Bc.

If |Bs| ≧ Bc, allow the indicating portion 10 to give a warning in step S13, and if |Bs| < Bc, stop the indication of warning in step S14. Thereafter, in step S15, drive the photographing lens 1 on the basis of the amount of defocus DEF calculated in the above step through the lens driving portion 6, and return to step S2 again.

A pair of the object image signals are thus gathered twice at a time interval from the photoelectric converters 3a and 3b, and two new and old synthetic object image signals are calculated by adding a pair of the object image signals each to detect the image shake on the basis of the amount of relative image shake for these synthetic object image signals. Therefore, the image shake can be detected during non-focusing or even while the photographing lens is being driven. Further, the image shake can be detected even in chase driving mode, which was impossible with a conventional image shake detecting apparatus.

In the above embodiment, a warning is indicated when it is determined that an image shake has occurred. However, the shutter speed Ts calculated by an exposure control portion 8 may be changed into a shutter speed Tb which does not cause any image shake using equation (10) for exposure.

$$Tb = Bx \cdot Ts / Bc \quad (10)$$

In the construction of the above embodiment, the photoelectric converters 3a and 3b constitute the photoelectric converting means, the reimage forming lenses 2a and 2b the focus detecting optical system, the focus detect calculating portion 5a the focus detect calculating means, the lens driving portion 6 the driving means, memories C and D the memory means, the add calculating portion 9a the adding means, and the displacement detecting portion 9b and the judging portion 9c the image shake detecting means respectively.

According to the present invention as described above, the photoelectric converting means calculates the synthetic object image signal by sequentially adding a pair of the object image signals, which occur intermittently, to detect the image displacement on the basis of the amount of displacement between a synthetic object image signal for the last time and a synthetic object image signal for this time, that is, the amount of relative displacement for detecting the image shake. Therefore, the image shake can be detected during nonfocusing or even while the photographing optical system is being driven.

Also even in chase driving mode, which was impossible with a conventional apparatus, the image shake can be detected.

Further since the image shake is detected while the lens is being driven before focusing in single mode or in one shot servo mode, exposure can be performed immediately after focusing if no image shake is found.

Figure 7:
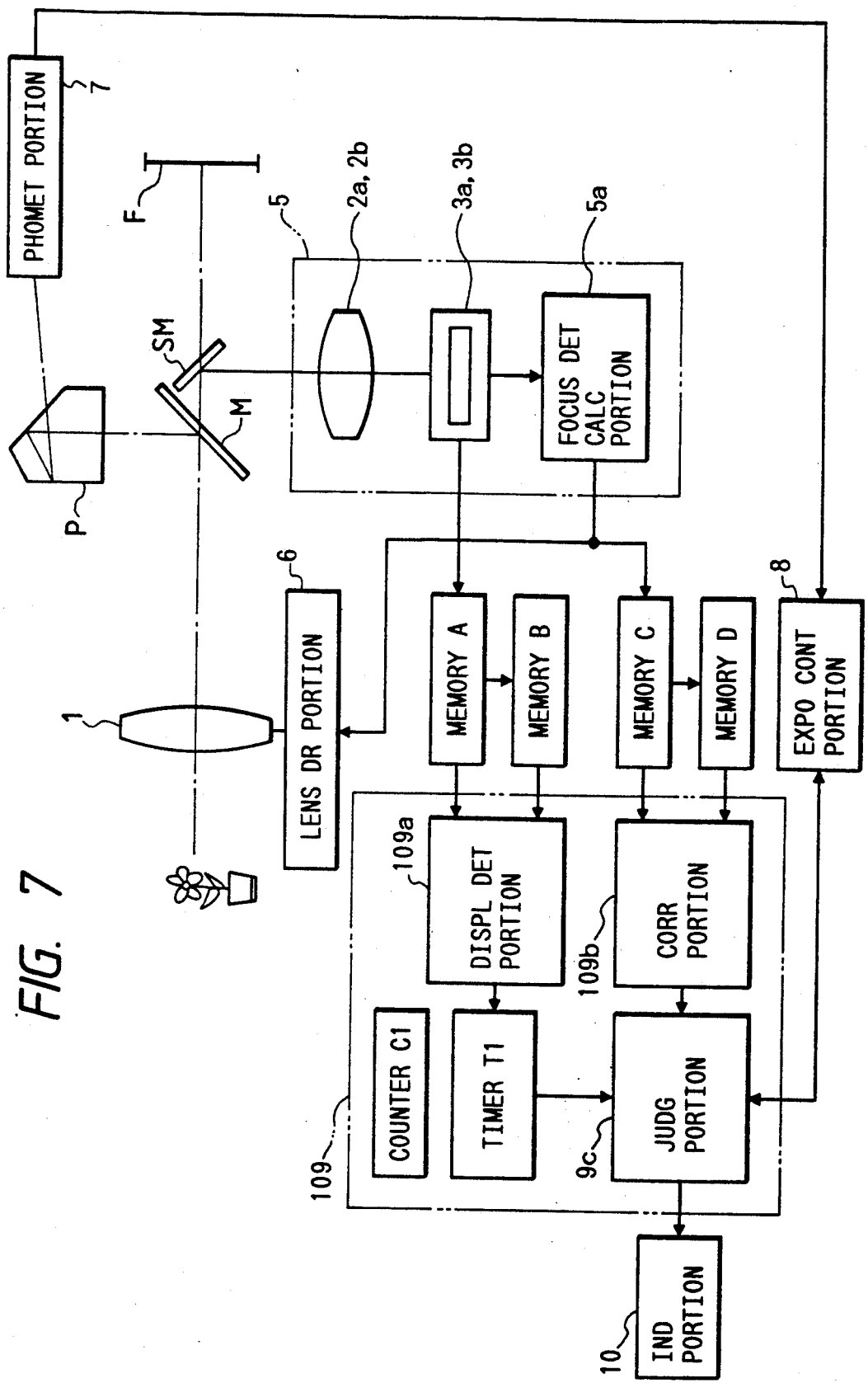
FIG. 7 is a block diagram showing another embodiment.

FIG. 7 is a block diagram showing another embodiment according to the present invention.

Light flux, which has passed through a photographing lens 1, passes through the central semitransparent portion of a main mirror M, and then is led to a focus detecting portion 5 by a submirror SM. Also a part of light flux, which has been reflected by the main mirror M, is led to a photometry portion 6 by a pentaprism P.

The focus detecting portion 5 is composed of reimage forming lenses 2a and 2b and photoelectric converters 3a and 3b as shown in the above FIGS. 4A and 4B, and a focus detect calculating portion 5a. The focus detect calculating portion 5a detects the amount of relative displacement d for detecting the focus on the basis of a pair of the object image signals Fa and Fb corresponding to the light intensity distribution for the object image on the photoelectric converters 3a and 3b as mentioned above, and calculates the amount of defocus DEF on the basis of this amount of relative displacement d for detecting the focus to output to a lens driving portion 7. The lens driving portion 7 calculates an amount of lens driving for causing the object image surface on the photographing lens 1 to coincide with the film surface F on the basis of the amount of defocus DEF to drive the photographing lens 1 for focusing.

The photometry portion 6 detects the brightness information by metering the light in the photographing picture to output to an exposure control portion 8. The exposure control portion 8 calculates the shutter speed and iris diaphragm value on the basis of the brightness information to output the shutter speed Ts to an image shake detecting portion 9 as mentioned later, and also to control the shutter and iris diaphragm mechanism (not shown).

Data memories A and B store the object image signal Fa to be intermittently detected by the photoelectric converters 3a. Whenever the object image signal is detected by the photoelectric converter 3a, the memory A transfers to the memory B the object signal data Fa' stored therein during detecting last time, and also stores the object image signal data Fa newly detected this time. The memory B stores the data Fa' for the last time transferred from the memory A.

Data memories C and D store the amount of relative displacement d for detecting the focus to be calculated by the focus detect calculating portion 5a. Whenever the amount of relative displacement d for detecting the focus is detected by the focus detect calculating portion 5a, the memory C transfers to the memory D the amount of relative displacement d(0) for detecting the focus stored therein during detection last time, and also stores an amount of relative displacement d(1) for detecting the focus newly detected this time. The memory D stores the data d(0) for the last time transferred from the memory C.

Accordingly, the object image signal Fa stored in the memory A and the amount of relative displacement d(1) for detecting the focus stored in the memory C are data for this time at the same point of time, and the object image signal Fa' stored in the memory B and the amount of relative displacement d(0) for detecting the focus stored in the memory D are data for the last time at the same point of time.

The image displacement detecting portions 10 and 9 are composed of displacement detecting portions 10 and 9a, correcting portions 10 and 9b, a judging portion 9c, a timer T1 and a counter C1.

Figure 6:
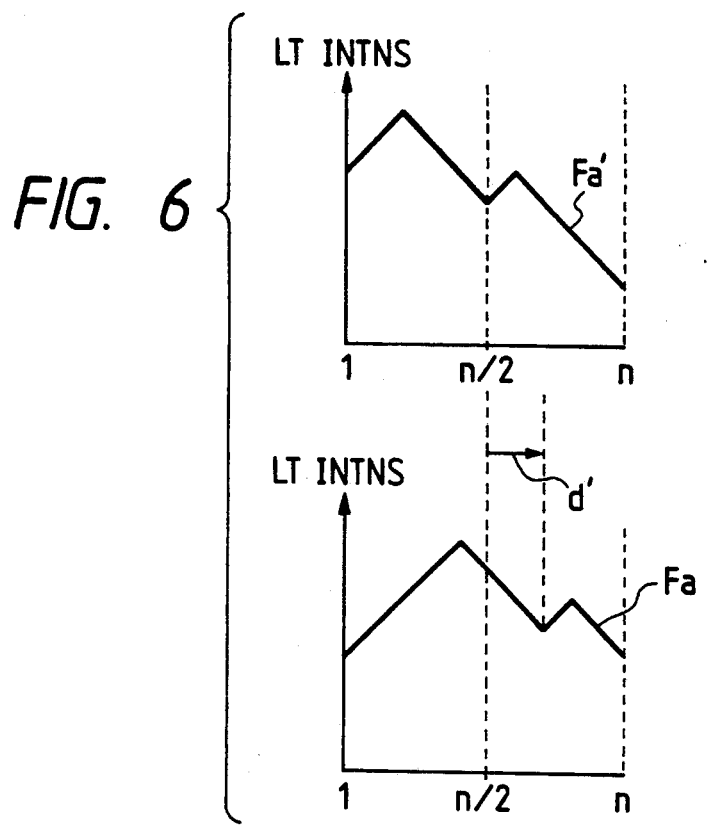
FIG. 6 is a view showing the aspect of a conventional image shake detection.

The displacement detecting portions 10 and 9a detect the amount of relative displacement d' for detecting the image shake as shown in FIG. 6 from the object image signal Fa' for the last time stored in the memory B and the object image signal Fa for this time stored in the memory A same as the amount of relative displacement d for detecting the focus has been obtained by the above-mentioned equations (1) and (2).

The correcting portions 10 and 9b calculate an amount of relative displacement dr for a pair of the object image signals attendant upon the driving of the photographing lens 1 from the time the amount of relative displacement d(0) for detecting the focus for the last time was detected until the amount of relative displacement d(1) for detecting the focus for this time has been detected on the basis of the amount of relative displacement d(0) for detecting the focus for the last time stored in the memory D and the amount of relative displacement d(1) for detecting the focus for this time stored in the memory C. Then the true amount of image shake Br is calculated by correcting the amount of relative displacement d' for detecting the image shake calculated by the displacement detecting portion 9a by an amount of relative displacement dr attendant upon the driving of this lens.

The timer T1 times a time interval, in which the photoelectric converters 3a and 3b generate the object image signal, that is, a time Tr from the time the object image signal stored in the memory B was generated until the object image signal stored in the memory A is generated.

The judging portion 9c obtains an amount of image shake Bx per unit time from the amount of image shake Br and the time Tr using the above-mentioned equation (8).

Then an amount of image shake Bs during time Ts while the shutter is opened on the basis of the shutter speed Ts calculated by the exposure control portion 8 using the above-mentioned equation (9). If $|Bs| \geq Bc$ when the amount of image shake Bs is compared with a predetermined value Bc, a warning will be indicated through the indicating portion 10.

Since when the image shake is judged by obtaining the amount of image shake Bs only once, it is not sure, it may be compared with a predetermined value Bc using an equation (9) on the basis of a statistical average value of a plurality of amounts of image shake Bs1, Bs2, Bs3, . . . calculated within a predetermined time.

The counter C1 counts how many times the object image has been detected by the photographic converters 3a and 3b.

How to calculate the amount of image shake Br by the displacement detecting portions 10 and 9a and the correcting portions 10 and 9b will be described.

Since the amount of relative displacement dr for a pair of the object image signals attendant upon the driving of the lens is a sum of an amount of movement of each object image signal attendant upon the driving of the lens as mentioned above, the amount of image displacement attendant upon the driving of the lens for one side of the object image signal is dr/2. Accordingly, the amount of true image shake Br can be obtained by deducting the amount of displacement dr/2 of one side of the object image signal due to the driving of the photographing lens 1 from the amount of relative displacement d' for detecting the image shake detected by the displacement detecting portions 10 and 9a. That is, $$Br = d' - dr/2 \tag{11}$$

The relationship of this equation (11) will be described referring to FIG. 8 typical showing it.

Figure 8:
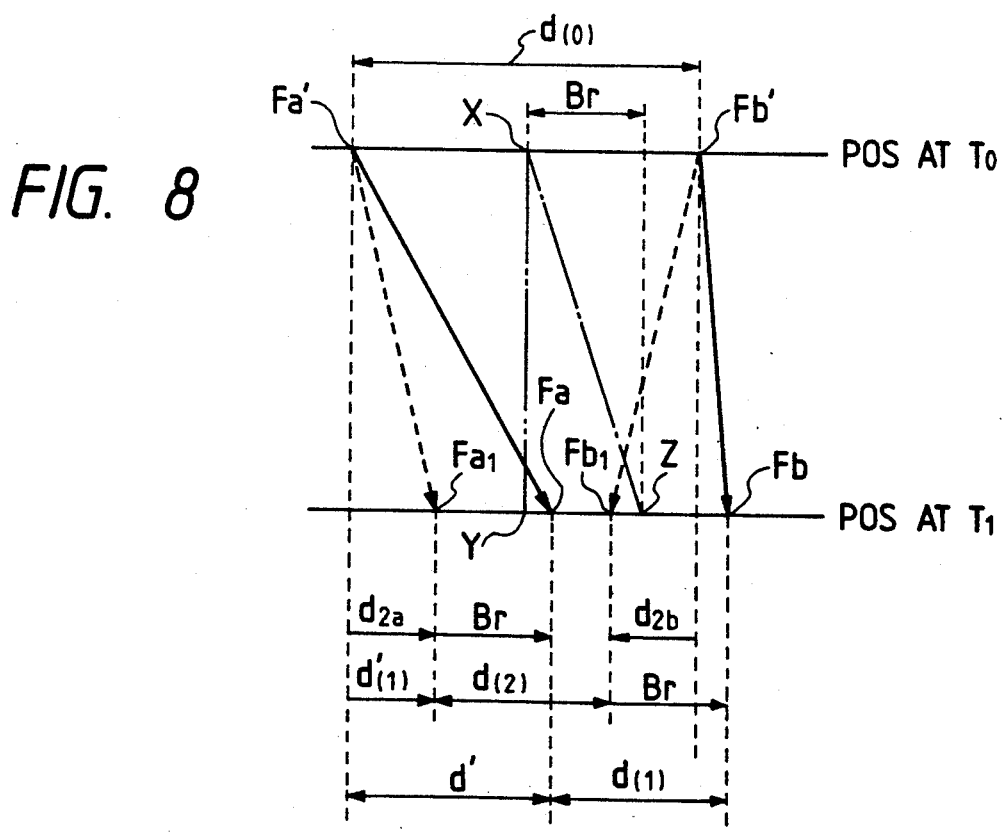
FIG. 8 is a diagram of assistance in explaining a method of calculating an amount of image shake.

At a time t0 in FIG. 8, the photoelectric converters 3a and 3b detect a pair of the object image signals Fa' and Fb' (for the last time), and the focus detect calculating portion 5a detects the amount of relative displacement d(0) for detecting the focus from these signals, and also calculates the amount of defocus DEF on the basis of the amount of relative displacement d(0) for detecting the focus as mentioned above. The lens driving portion 7 calculates the amount of driving of the photographing lens 1 on the basis of the amount of defocus DEF to drive the photographing lens 1.

At a time t1, the photoelectric converters 3a and 3b detect a pair of the object image signals Fa and Fb (for this time) again, and the focus detect calculating portion 5a detects the amount of relative displacement d(1) for detecting the focus on the basis of these signals. Further, the displacement detecting portions 10 and 9a detect a difference between one side of the object image signal Fa' for the last time and that for this time Fa, that is, the amount of relative displacement d' for detecting the image shake.

Assuming that the focus was in a front focus state at a time t0 before the photographing lens 1 is driven, a pair of the object images are displaced by d1a and d1b toward the optical axis L side to each other respectively as shown in FIG. 4B, and the object images move in such a direction as to keep away from the optical axis L to each other due to driving of the photographic lens 1 for focusing.

Figure 4C:
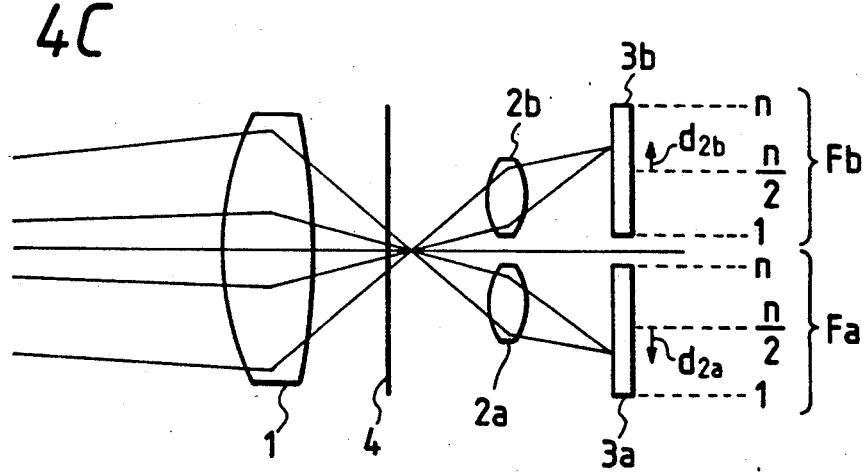

On the other hand, assuming that the focus was in a rear focus state at a time t1 before the photographing lens 1 is driven, a pair of the object images are displaced in positions d2a and d2b far away from the optical axis L to each other respectively as shown in FIG. 4C, and the object images move in such a direction as to be closer to the optical axis L to each other due to driving of the photographic lens 1 for focusing.

If it is assumed at this time that there had been no image shake from the detection point of time at t0 through the detection point of time at t1, the amounts of movement of the pair of the object images between before and after the driving of the lens would have been the same.

FIG. 8 shows the latter case where the focus was in a rear focus state at a time t0 before the lens is driven. Assuming that there is no image shake during a period from a time t0 through t1, a pair of the object image positions move so that they get near to each other by d2a and d2b respectively from positions shown by Fa' and Fb' at the time t0 along broken lines in FIG. 8 as the lens is driven, and reach positions Fa1 and Fb1 at a time t1 after the lens is driven. Assuming that the amount of relative displacement for detecting the focus for a pair of the object image signals Fa1 and Fb1 at the time t1 is regarded as d(2) as shown in FIG. 8, the amount of relative displacement dr for a pair of the object image signals attendant upon the driving of the lens is, $$dr = d(0) - d(2) = d2a + d2b = 2 \cdot d2a \tag{12}$$

On the other hand, since the amount of relative displacement d'(1) for detecting the image shake is a difference in position between the object image signals Fa' and Fa1, $$d'(1) = d2a \tag{13}$$

Accordingly, from equation (11), $$Br = d'(1) - dr/2 = d2a - 2 \cdot d2a/2 = 0 \tag{14}$$

That is, since there is naturally no image shake, Br becomes 0.

If there is an image shake Br, however, positions of a pair of the object image signals move along solid lines in FIG. 8 from positions shown by Fa' and Fb' at the time t0 as the lens is driven, and reach positions Fa and Fb at the time t1 after the lens is driven. That is, the positions of a pair of the object image signals at the time t1 displace by Br in the same direction due to the image shake. Since the amount of relative displacement for detecting the focus for a pair of the object image signals at the time t1 is d(1) as shown in FIG. 8, the amount of relative displacement dr for a pair of the object image signals attendant upon the driving of the lens is, $$dr = d(0) - d(1) \tag{15}$$

on the other hand, since the amount of relative displacement for detecting the image shake is d', the amount of image shake Br is obtained from equation (11) as follows:

$$\begin{aligned} Br &= d' - dr/2 \\ &= d' - \{d(0) - d(1)\}/2 \end{aligned} \tag{16}$$

The amount of true image shake Br can be obtained by thus calculating the amount of relative displacement d' for detecting the image shake of one side of the object image signal after the lens is driven, and by deducting, from this value, the amount of relative displacement dr/2 for the object image signal which occurred as the lens is driven.

In the above equations (11) to (16), although the amount of relative displacement d' for detecting the image shake was obtained by using one side of the object image signals Fa', Fa1 and Fa, the same result can be obtained by using the other side of the object image signals Fb', Fb1 and Fb. The above amount of image shake Br was calculated taking, as an example, a case where the focus was in a rear focus state at a time t0 before the lens is driven. However, the same result can be obtained by using the above-mentioned calculation procedure even if the focus was in a front focus state before the lens is driven.

Figure 9:
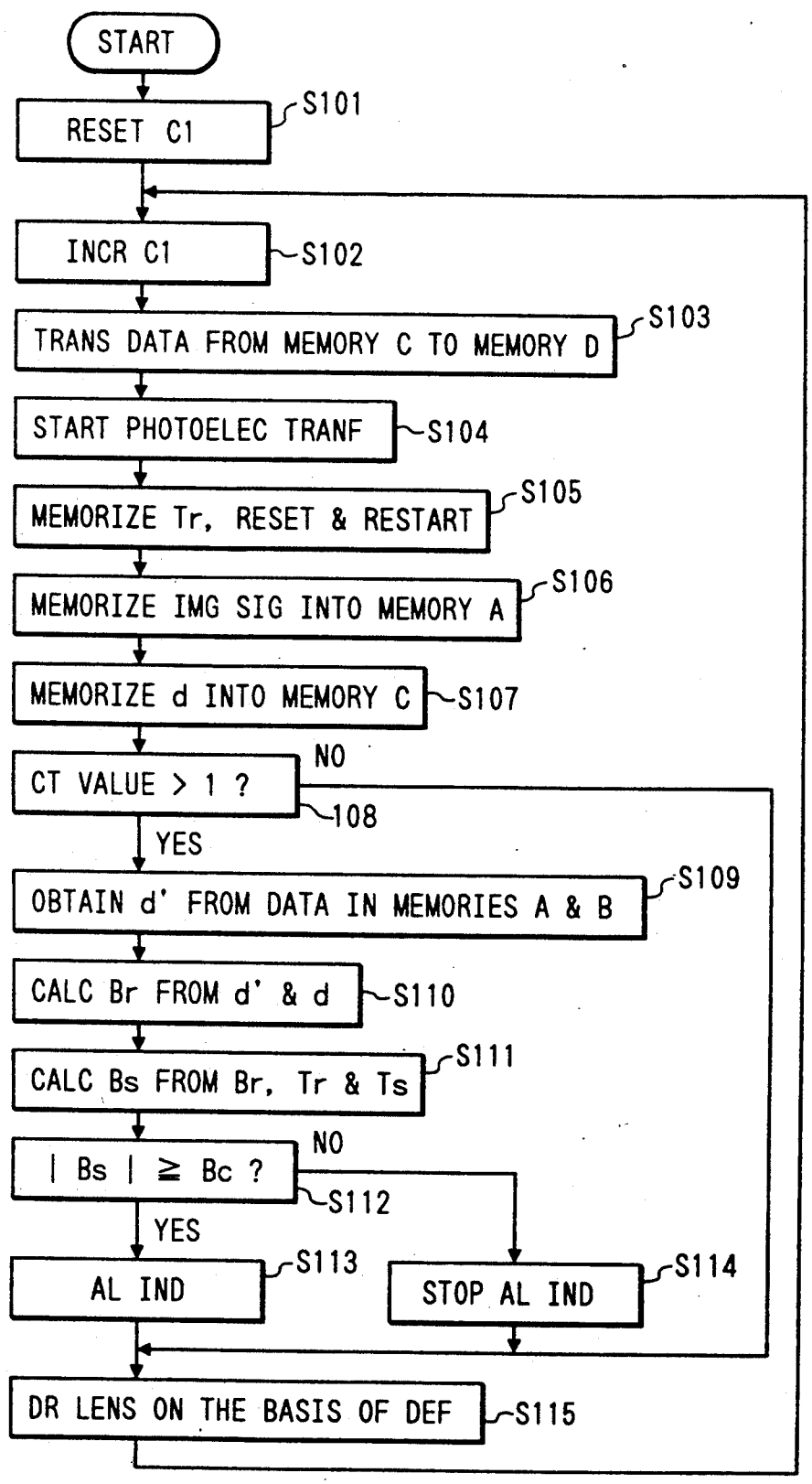
FIG. 9 is a flow chart showing the operation of an apparatus according to this embodiment.

FIG. 9 is a flow chart showing the operation of an image shake detecting apparatus according to the present invention. The overall operations of the apparatus will be described referring to FIG. 9.

First in step S101, reset a counter C1, and proceed to step S102 to increment the counter C1. In step S103, transfer the object image signal Fa' data for the last time from the memory A to the memory B, and the amount of relative displacement d(0) data for detecting the focus for the last time from the memory C to the memory D respectively. In the following step S104, start photoelectric conversion. Further in step S105, memorize the current value of the timer T1, that is, a detection time interval Tr for the photoelectric converters 3a and 3b, and thereafter reset the timer T1 for restarting.

In step S106, memorize the object image signal Fa for this time detected by the photoelectric converter 3a in the memory A. Further, in step S107, memorize the amount of relative displacement d(1) for detecting the focus for this time detected by the focus detect calculating portion 5a in the memory C. In the following step S108, distinguish whether or not the value of the counter C1 is greater than 1, that is, whether or not the object image has been detected twice or more in the photoelectric converters 3a and 3b. If detected twice or more, proceed to step S109, and if not, proceed to step S115.

In step S109, obtain the amount of relative displacement d' for detecting the image shake on the basis of the object image signal Fa for this time stored in the memory A and the object image signal Fa' for the last time stored in the memory B. Proceed to step S110 to calculate the amount of true image shake Br from d' obtained in the above step and the amounts of relative displacement d(0) and d(1) for detecting the focus for the last time and this time stored in the memories C and D by using the above equation (16).

Further in step S111, calculate the amount of image shake Bs, while the shutter is opened, from the calculated amount of true image shake Br, the shutter speed Ts calculated by the exposure control portion 8 and time Tr by using the above-mentioned equations (8) and (9).

On the basis of the above calculation result, compare the amount of image shake Bs with a predetermined value Bc in step S112. If Bs ≧ Bc, proceed to step S13 to give a warning through an indicating portion 10, and if Bs ≧ Bc, proceed to step S114 to stop the indication of warning on the indicating portion 10.

In step S115, calculate the amount of driving the lens on the basis of the amount of defocus DEF calculated from the amount of relative displacement d(1) for detecting the focus for this time through the lens driving portion 7, and drive the photographing lens 1.

After the above process has been finished, return to step S102 again.

Thus calculate the amount of relative displacement d' for detecting the image shake through the object image signal for the last time and this time detected by the photoelectric converter 3a, and then calculate the amount of relative displacement dr/2 for a pair of the object image signals caused by the driving of the photographing lens 1 on the basis of the amount of relative displacement d for detecting the focus for the last time and this time detected by the focus detect calculating portion 5a, that is, the amount of displacement due to the driving of the lens included in the amount of relative displacement d' for detecting the above image shake.

Since the true image shake is detected by deducting dr/2 from d', it is possible to correctly detect any image shake during nonfocusing or while the lens is being driven. An image shake can be thereby detected even in chase driving mode, which was conventionally impossible, and further the image shake is detected while the lens is being driven in single mode or in one shot servo mode. Therefore, if there is no image shake, the step can proceed to the exposure operation immediately after focusing, and the response of the shutter release is improved.

Although the photoelectric conversion is started after the driving of the lens has been finished in the above embodiment, so-called "overlap servo", in which the next photoelectric conversion is started without waiting for completed driving, may be performed. By a combination of an image shake detecting apparatus according to the present invention with the overlap servo, the image shake can be detected while the lens is being driving even if a time for driving the lens at a time becomes long. Therefore, it is possible to know an occurrence of an image shake without waiting until the driving of the lens is finished.

In the above embodiment, a warning is indicated when it has been determined that image shake occurs, but a shutter speed Tb, which does not cause any image shake, may be obtained from the shutter speed Ts by using equation (10) for exposure through the exposure control portion 8.

In the construction of the above embodiment, the photographing lens 1 constitutes the photographing optical system, the photoelectric converters 3a and 3b the photoelectric converting means, the reimage forming lenses 2a and 2b the focus detecting optical system, the focus detect calculating portion 5a the focus detect calculating means, the lens driving portion 7 the driving means, the memory B the first memory means and the memory D the second memory means, the displacement detecting portions 10 and 9a the relative displacement information detecting means, and the correcting portion 109b the image shake detecting means respectively.

According to the present invention as described above, one side of the light receiving portion of the photoelectric converting means detects the relative displacement information for detecting the image shake by the relative displacement information detecting means on the basis of the object image signals occurring for the last time and this time, and calculates the relative displacement information for a pair of the object image signals attendant upon the driving of the photographing optical system by the image shake detecting means on the basis of the amount of relative displacement for detecting the focus for the last time and this time obtained by the focus detect calculating means. Then the true image shake is detected by comparing the relative displacement information for detecting the image shake with the relative displacement information attendant upon the driving of the lens for a pair of the object image signal by the image shake detecting means. Therefore, it is possible to detect any image shake during nonfocusing or even while the photographing lens is being driven, and further the response in obtaining the image shake detecting result has rapidly advanced.

Figure 10:
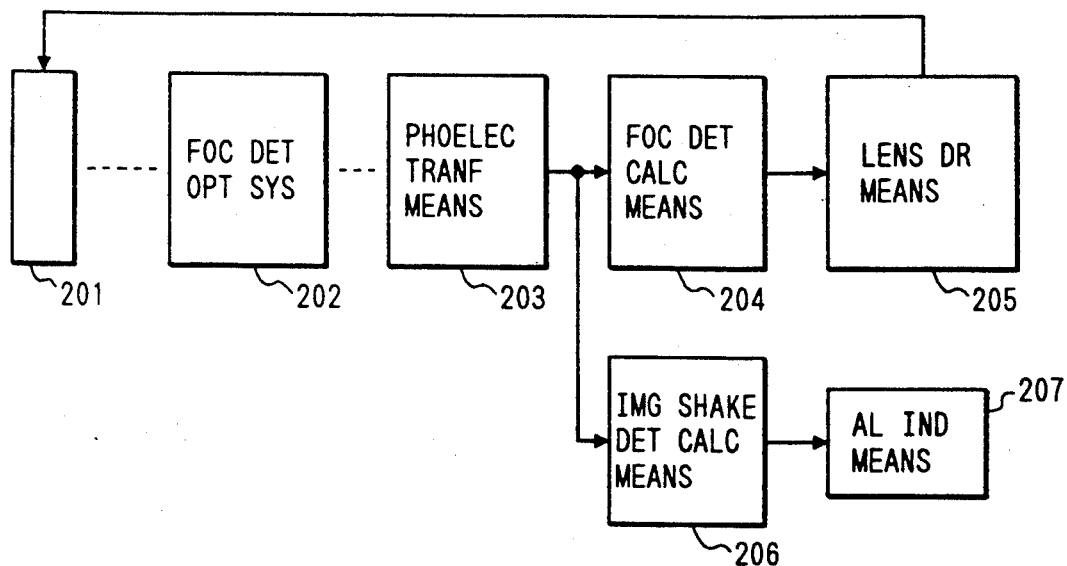
FIG. 10 is a block diagram showing the construction of another embodiment for an image shake detecting apparatus according to the present invention.

FIG. 10 is a block diagram showing another embodiment according to the present invention, and a photographing lens 201 is means for forming the image of an object for photographing on a film surface 212.

A focus detecting optical system 202 has the same construction as shown in FIG. 4A, and causes the object image formed by the photographing lens 201 to be reformed on photoelectric converting means 203.

The photoelectric converting means 203 generates the object image signal by photoelectrically converting a pair of the object image reformed by the focus detecting optical system 202.

Focus detect calculating means 204 detects a deviation (amount of defocus) between the focused surface for the current object image on the photographing lens 201 and the film 212 surface by performing the above-mentioned focus detect calculation, that is, the difference type correlating algorithm for the object image signal output by the photoelectric converting means 203. Then the focus detect calculating means 204 obtains an amount of driving of the photographing lens 201 for causing the object image surface of the photographing lens 201 to coincide with the film 212 surface on the basis of the amount of defocus.

On the basis of the amount of driving the lens calculated by the focus detect calculating means 204 as mentioned above, the lens driving means 205 controls the driving of the photographing lens 201 to obtain a focused state. The lens driving means 205 is composed of a motor for driving the lens and a driving circuit for the motor.

Image shake detect calculating means 206 detects any image shake by performing the multiplication type algorithm as mentioned later for the object image signal to be output from the photoelectric converting means 203 to operate alarm indicating means 207 in accordance with the detection result.

The alarm indicating means 207 is composed of an indicating device using a light emitting element or an alarm sounder such as buzzers so that a photographer may recognizes visually or aurally.

The above-mentioned focus detect calculating means 4 and image shake detect calculating means 206 are composed of microcomputers.

Figure 11:
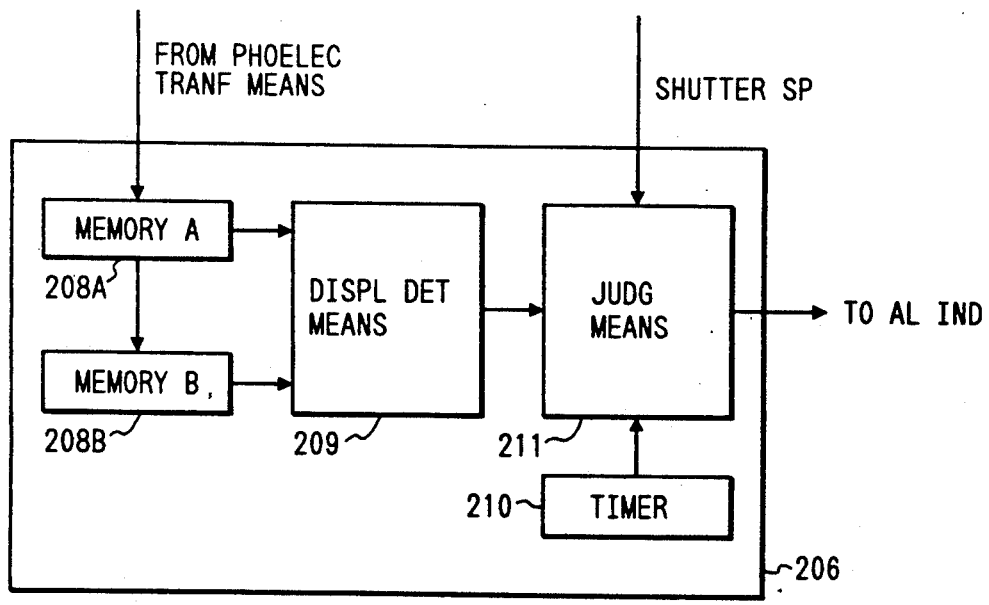
FIG. 11 is a block diagram showing the detailed construction of an image shake detect calculating means.

FIG. 11 shows a detailed block diagram for image shake detect calculating means 206. Memories 208A and 208B store one side of image signal (Fa or Fb) out of the object image signals which are generated at time intervals by the photoelectric converting means 203. These memories are constructed so that the latest object image signal is stored in the memory 208A, the object image signal for the last time is stored in the memory 208B, and whenever a new object image signal occurs, the content of the memory 208A is shifted into the memory 208B, and then the content of the memory 208A is replaced with a new object image signal.

Displacement detecting means 209 obtains an amount of relative displacement d for the object images stored in the memories 208A and 208B which were temporally different in the following way:

Assuming, for example, the data of the object image signals Fa and Fa' to be a(p) and e(p) (however, p=1 to n) respectively, first obtain the amount of correlation R(L) through the multiplication type algorithm shown in equation (7).

$$R(L) = \sum_i a(i + L) \times e(i) \quad (17)$$

Figure 12A:
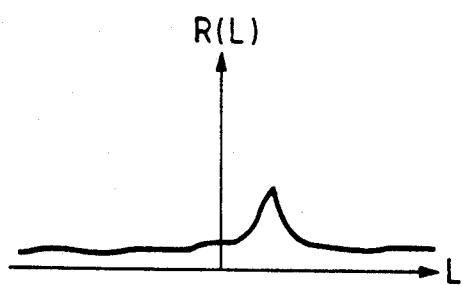
FIGS. 12A, 12B, 13A and 13B are diagrams of assistance in explaining the principle of the image shake detection according to the present invention.

In equation (17), however, L is an integral number, and is an amount of relative displacement in which a pitch in the light receiving element for a pair of light receiving element output data has been used as units. For the amount of correlation R (L) obtained in equation (17), the higher the degree of correlation is, the higher the amount of correlation is as shown, for example, in FIG. 12A.

The calculation result of equation (17) is that the amount of correlation D (L) is a maximum of amount of shift of L=kj with high correlation data. It is possible to obtain the amount of relative displacement d, which becomes a maximum value D (L) min=C (d) for continuous amount of correlation by using the three-point interpolation technique in equation (18).

$$d = kj + D/SLOP \quad (18)$$

$$R(d) = R(kj) + |D|$$

-continued
$$D = \{R(kj + 1) - R(kj - 1)\}/2$$

$$SLOP = \text{MAX}(R(kj) - R(kj + 1), R(kj) - R(kj - 1))$$

The amount of relative displacement d obtained in equation (18) is an amount of image shake Br, and a shake warning may be given or the shutter speed may be changed not to cause any image shake in accordance with the amount of image shake Br.

In equation (17), we consider a case where the object image signals have different output levels and a coefficient M ($\neq 1$) is applied to one side of output. That is, when obtaining an amount of correlation R (L) by substituting M$\times$e (i) for e (i) in equation (17), only an amount M-times the amount of correlation R (L) obtained in equation (17) has been obtained like equation (19). Therefore, it can be seen that no error will essentially occur even if the amount of relative displacement d is obtained by performing the three-point interpolation calculation in equation (18) for the amount of correlation $R_0(L)$ obtained in equation (19).

Figure 12B:
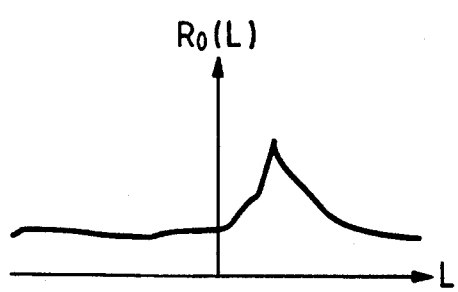
Figure 13A:
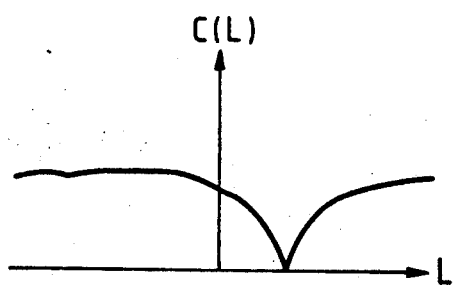
Figure 13B:
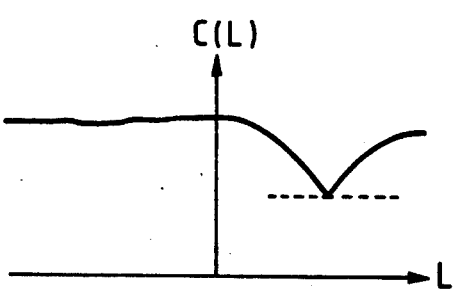

FIG. 12B shows the amount of relative correlation $R_0(L)$.

$$\begin{aligned} R_0(L) &= \sum_i a(i + L) \times M \times e(i) \\ &= M \times \sum_i a(i + L) \times e(i) \\ &= M \times R(L) \end{aligned} \quad (19)$$

That is, an image shake can be correctly detected by using the multiplication type correlation algorithm even if the output level of an object image signals at a different time varies in the image shake detection.

A timer 210 is means for timing an interval at which the photoelectric converting means 203 generates an object image signal, and transmits a time Tr from the time an object image signal stored in the memory 208B occurs until an object image signal stored in the memory 208A occurs to judging means 211. The judging means 211 obtains an amount of image shake Bx per unit time from the amount of image shake Br=d and the time Tr by using the above-mentioned equation (8).

Receive a shutter speed Ts at the point of time from exposure control means (not shown) to obtain an amount of image shake Bs during a period Ts in which the shutter is open by using the above-mentioned equation (9). Finally compare the amount of image shake Bs with a predetermined amount of image shake Bc like equation (20) to control alarm indicating means 207 on the basis of the comparison result.

If $|Bs| \geq Bc$, indicate a warning. (20)

If $|Bs| < BC$, no warning is indicated.

Since it is not sure in the comparison in equation (20) to use an amount of image shake Bs obtained only by a single detection, a statistical average value for the amount of image shake Bs within a predetermined time may be used.

Figure 14:
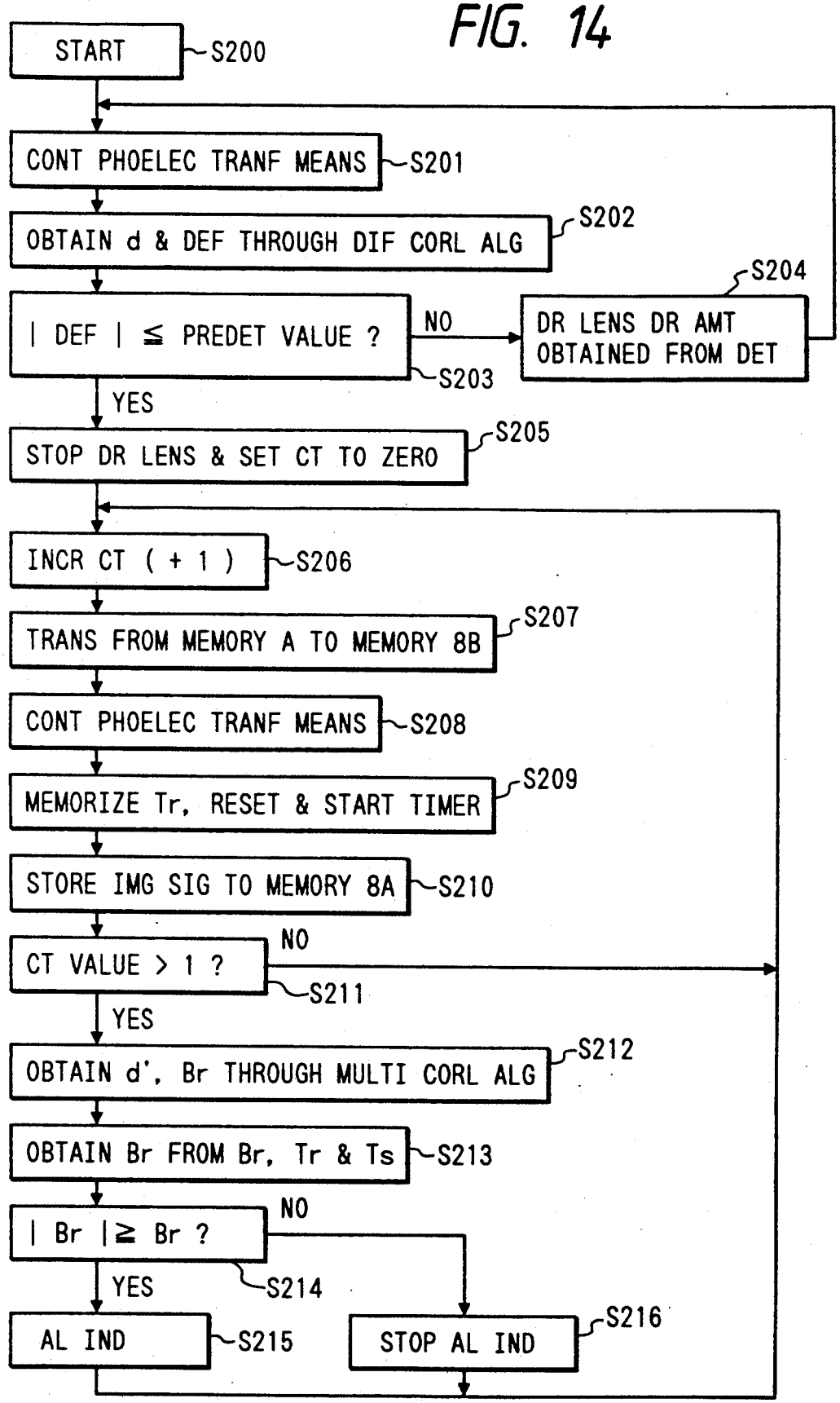
FIG. 14 is a flow chart showing the operation of an image shake detecting apparatus according to the present invention.
Figures 15A, 16A, 17A, 18A, 19A:
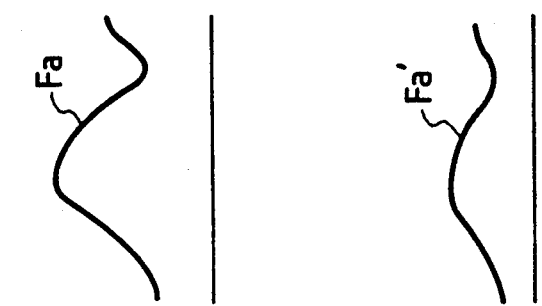
FIGS. 15A, 15B, 16A, 16B, 17A, and 17B are diagrams of assistance in explaining the method of detecting the focus.
FIGS. 18A, 18B, 19A, and 19B are diagrams of assistance in explaining a conventional image shake detecting system.
Figures 15B, 16B, 17B, 18B, 19B:
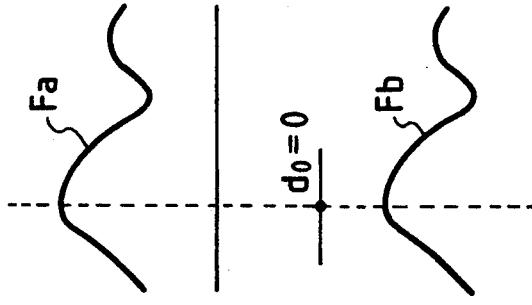

FIG. 14 is a flow chart showing the operation when the focus detect calculating means 204 and the image shake detect calculating means 206 for the above-mentioned embodiment are composed of microcomputers.

S200 Start the process by lightly pressing the release button of a camera body.

S201 Control the charge accumulation time so that the object image signal is at an appropriate level to operate the photoelectric converting means 203.

S202 Analog to-digital convert a pair of the object image signal to be output from the photoelectric converting means 203, and perform the difference type correlating algorithm for a pair of data to obtain the amount of relative displacement d and the amount of defocus.

S203 Judge whether or not the absolute value of the amount of defocus exceeds a predetermined value, for example, 100 $\mu$m, and if exceeded, judge it as nonfocused and proceed to S204. If not exceeded, judge it as focused, and proceed to S205.

S204 Drive the lens by an amount of driving obtained by converting the amount of defocus to the amount of driving the lens, and return to S201 after the driving is finished.

S205 Stop the driving of the lens for locking, and clear the counter.

S206 Increment the counter.

S207 Transfer the content of the memory 208A to the memory 208B.

S208 Control the charge accumulation time so that the object image signal is at an appropriate level to operate the photoelectric converting means 203.

S209 Memorize a time Tr of the timer. Thereafter reset and start the timer.

S210 Analog-to-digital convert a pair of the object image signal to be output from the photoelectric converting means 203, and store one side of the object image signal for detecting the image shake into the memory 208A.

S211 Confirm whether or not the photoelectric converting means 203 has operated twice or more. Since the image shake can be detected when operated twice or more, proceed to S212, and when operated only once, pass the image shake detection and return to S206.

S212 Obtain the amount of relative displacement d=the amount of image shake Br by processing the date in the memories 208A and 208B through the multiplication type algorithm.

S213 Obtain the amount of image shake Bs from the amount of image shake Br, the time Tr and the shutter speed Ts like equations (9) and (20).

S214 Compare the amount of image shake $|Bs|$ with a predetermined amount of image shake Bc, and if the former is larger, proceed to S215, and if smaller, proceed to S216.

S215 Indicate an alarm, and return to S206.

S216 Stop indicating the alarm, and return to S206.

Although an image shake is detected while the lens is stopped after focusing in the above-mentioned embodiment, the image shake may be detected while the lens is being driven before focusing. In this case, the amount of relative displacement of the object image due to the driving of the lens may be corrected when obtaining the amount of relative displacement for detecting the image shake.

Also in the focus detect calculation, the multiplication type correlation algorithm may be applied. Since, however, the execution speed of multiplication instruction is considerably slower than that of addition and subtraction instruction generally in microcomputers, it is advantageous in the focus detect calculation to use the differential correlating algorithm like the above embodiment.

In the above-mentioned embodiment, a warning is indicated when it has been judged that an image shake occurs. However, the shutter speed Ts may be set to such a shutter speed Tb as not to cause any image shake like equation (10) by controlling the exposure control means.

According to an image shake detecting apparatus using a pupil division system focus detecting apparatus according to the present invention as mentioned above, it is possible to eliminate a detection error for amount of image shake resulting from a difference in the output level of the object image signal by obtaining the amount of relative displacement of the object images which are temporally different through the multiplication type algorithm. Also in the focus detection, since the output level of a pair of the object image signals are almost the same, very excellent effects such as improving the calculation speed can be obtained by obtaining the amount of relative displacement through the difference type correlating algorithm.

I claim:

1. A camera image shake detecting apparatus, comprising:
   a photographing optical system;
   photoelectric converting means for having a pair of light receiving portions consisting of a plurality of light receiving elements and generating at least twice at time intervals a pair of object image signals corresponding to a light intensity distribution of an object image formed on said light receiving portions;
   a focus detecting optical system for forming the object image on the pair of light receiving portions of said photoelectric converting means by means of light flux passing through said photographing optical system;
   focus detect calculating means for detecting a state of focus adjustment of said photographing optical system on the basis of a pair of the object image signals generated by said photoelectric converting means;
   adding means for calculating a synthetic object signal by adding a pair of the object image signals generated by said photoelectric converting means;
   memory means for memorizing said synthetic object image signal; and
   amount of image shake detecting means for detecting an amount of image shake on the basis of the amount of relative displacement between the previous synthetic object image signal stored in said memory means and the subsequent synthetic object image signal calculated by said adding means.

2. A camera image shake detecting apparatus, comprising:
   a photographing optical system;
   photoelectric converting means for having a pair of light receiving portions consisting of a plurality of light receiving elements and generating at least twice at time intervals a pair of object image signals corresponding to a light intensity distribution of an object image formed on said light receiving portions;
   a focus detecting optical system for forming the object image on the pair of light receiving portions of said photoelectric converting means by means of light flux passing through said photographing optical system;
   focus detect calculating means for detecting a state of focus adjustment of said photographing optical system on the basis of the pair of the object image signals generated by said photoelectric converting means;
   adding means for calculating a synthetic object signal by adding a pair of the object image signals generated by said photoelectric converting means; and
   amount of image shake detecting means for detecting an amount of image shake on the basis of the amount of relative displacement between the previous synthetic object image signal and the subsequent synthetic object image signal.

3. A camera image shake detecting apparatus according to claim 1, wherein said amount of image shake detecting means calculates an amount of image shake per unit time by dividing said amount of image shake by a time interval in occurrence between the previous and the subsequent synthetic object image signals.

4. A camera image shake detecting apparatus according to claim 3, wherein said amount of image shake detecting means calculates the amount of image shake per exposure time by multiplying the amount of image shake per said unit time by a shutter speed.

5. A camera image shake detecting apparatus according to claim 4, further comprising controlling means for controlling the shutter speed so that the amount of image shake per exposure time becomes less than a predetermined value in accordance with said amount of image shake.

6. A camera image shake detecting apparatus according to claim 1, further comprising alarm means for indicating an alarm in accordance with said amount of image shake.

7. A camera image shake detecting apparatus according to claim 1, wherein said amount of image shake detecting means calculates said amount of image shake twice or more to output an average value as the amount of image shake.

8. A camera image shake detecting apparatus according to claim 1, wherein said amount of image shake detecting means detects the amount of image shake using an algorithm for detecting the amount of relative image displacement.

9. A camera image shake detecting apparatus according to claim 2, wherein said amount of image shake detecting means calculates an amount of image shake per unit time by dividing said amount of image shake by a time interval in occurrence between the previous and the subsequent synthetic object image signals.

10. A camera image shake detecting apparatus according to claim 9, wherein said amount of image shake detecting means calculates the amount of image shake per exposure time by multiplying the amount of image shake per said unit time by a shutter speed.

11. A camera image shake detecting apparatus according to claim 10, further comprising controlling means for controlling the shutter speed so that the amount of image shake per exposure time becomes less than a predetermined value in accordance with said amount of image shake.

12. A camera image shake detecting apparatus according to claim 2, further comprising alarm means for indicating an alarm in accordance with said amount of image shake.

13. A camera image shake detecting apparatus according to claim 2, wherein said amount of image shake detecting means calculates said amount of image shake twice or more to output an average value as the amount of image shake.

14. A camera image shake detecting apparatus according to claim 2, wherein said amount of image shake detecting means detects the amount of image shake using an algorithm for detecting the amount of relative image displacement.

15. A camera image shake detecting apparatus, comprising:
- a photographing optical system;
- photoelectric converting means for having a pair of light receiving portions consisting of a plurality of light receiving elements and generating at least twice at time intervals a pair of object image signals corresponding to a light intensity distribution of an object image formed on said light receiving portions;
- a focus detecting optical system for forming the object image on the pair of light receiving portions of said photoelectric converting means by means of light flux passing through said photographing optical system;
- focus detecting means for detecting a state of focus adjustment of said photographing optical system on the basis of a pair of the object image signals generated by said photoelectric converting means; and
- amount of image shake detecting means for detecting an amount of image shake on the basis of the amount of relative displacement between the previous object image signal and the subsequent object image signal generated by one side of light receiving portion of said photoelectric converting means, wherein said amount of image shake detecting means detects the amount of image shake by correcting said amount of relative displacement in accordance with the amount of relative displacement of the object image resulting from the movement of said photographing optical system by means of said driving means which occurred while these two object image signals have been generated.

16. A camera image shake detecting apparatus, comprising:
- a photographing optical system;
- photoelectric converting means for having a pair of light receiving portions consisting of a plurality of light receiving elements and generating at least twice at time intervals a pair of object image signals corresponding to a light intensity distribution of an object image formed on said light receiving portions;
- a focus detecting optical system for forming the object image on a pair of light receiving portions of said photoelectric converting means by means of light flux passing through said photographing optical system;
- focus detecting means for detecting a state of focus adjustment of said photographing optical system on the basis of a pair of the object image signals generated by said photoelectric converting means;
- memory means for storing an object image signal previously generated at one side of light receiving portion of said photoelectric converting means, and also an amount of relative displacement for a pair of previously generated object image signals; and
- image shake detecting means for deciding an amount of object image shake on the basis of the amount of relative displacement decided by the focus detecting means on the basis of the pair of subsequently generated object image signals, the amount of relative displacement stored in the memory means, and the amount of relative displacement between the object image signal subsequently generated by one side of said light receiving portion and the object image signal stored in the memory means.

17. A camera image shake detecting apparatus according to claim 15, wherein said amount of image shake detecting means decides the amount of image shake by deducting ½ of a difference between the amount of relative displacement previously detected and the amount of relative displacement subsequently detected from the amount of relative displacement between the object image signal previously generated and the object image signal subsequently generated on the same light receiving portion of said photoelectric converting means.

18. A camera image shake detecting apparatus according to claim 15, wherein said amount of image shake detecting means calculates an amount of image shake per unit time by dividing said amount of image shake by a time interval in occurrence between the previous and the subsequent object image signals.

19. A camera image shake detecting apparatus according to claim 18, wherein said amount of image shake detecting means calculates the amount of image shake per exposure time by multiplying the amount of image shake per said unit time by a shutter speed.

20. A camera image shake detecting apparatus according to claim 19, further comprising controlling means for controlling the shutter speed so that the amount of image shake per exposure time becomes less than a predetermined value in accordance with said amount of image shake.

21. A camera image shake detecting apparatus according to claim 15, further comprising alarm means for indicating an alarm in accordance with said amount of image shake.

22. A camera image shake detecting apparatus according to claim 15, wherein said amount of image shake detecting means calculates said amount of image shake twice or more to output an average value as the amount of image shake.

23. A camera image shake detecting apparatus according to claim 15, wherein said amount of image shake detecting means detects the amount of image shake using the algorithm for detecting the amount of relative image displacement.

24. A camera image shake detecting apparatus according to claim 15, wherein said photoelectric converting means is a charge accumulation type sensor, and said driving means drives said photographing optical system while the charge is being accumulated.

25. A camera image shake detecting apparatus according to claim 16, wherein said amount of image shake detecting means decides the amount of image shake by deducting ½ of said amount of relative displacement from the amount of displacement between the previous and the subsequent object images on the same light receiving portion of said photoelectric converting means.

26. A camera image shake detecting apparatus according to claim 16, wherein said amount of image shake detecting means calculates an amount of image shake per unit time by dividing said amount of image shake by a time interval in occurrence between the previous and the subsequent synthetic object image signals.

27. A camera image shake detecting apparatus according to claim 26, wherein said amount of image shake detecting means calculates the amount of image shake per exposure time by multiplying said amount of image shake per unit time by a shutter speed.

28. A camera image shake detecting apparatus according to claim 27, further comprising controlling means for controlling the shutter speed so that the amount of image shake per exposure time becomes less than a predetermined value in accordance with said amount of image shake.

29. A camera image shake detecting apparatus according to claim 16, further comprising alarm means for indicating an alarm in accordance with said amount of image shake.

30. A camera image shake detecting apparatus according to claim 16, wherein said amount of image shake detecting means calculates said amount of image shake twice or more to output an average value as the amount of image shake.

31. A camera image shake detecting apparatus according to claim 16, wherein said amount of image shake detecting means detects the amount of image shake using an algorithm for detecting the amount of relative image displacement.

32. A camera image shake detecting apparatus according to claim 16, wherein said photoelectric converting means is a charge accumulation type sensor, and said driving means drives said photographing optical system while the charge is being accumulated.

33. An image shake detecting apparatus, comprising:
a photographing optical system for forming an object image on a predetermined focus surface;
photoelectric converting means for having a pair of light receiving portions consisting of a plurality of light receiving elements and generating at least twice at time intervals a pair of object image signals corresponding to a light intensity distribution of an object image formed on said light receiving portions;
a focus detecting optical system for forming the light intensity distribution corresponding to a pair of object images to be formed by means of light flux passing through a different pupil area of said photographing optical system on a pair of light receiving portions of said photoelectric converting means;
focus detecting means for deciding an amount of relative displacement which occurs between the previous and subsequent object image signals on the basis of the object image signal generated by the light receiving portions of said photoelectric converting means, and detecting the amount of defocus of the object image surface of said photographing optical system to said predetermined focus surface on the basis of said amount of relative displacement; and
amount of image shake detecting means for deciding an amount of displacement on said light receiving portion between the previous and the subsequent object images through a multiplication type algorithm on the basis of the previous and subsequent object image signals generated from the same light receiving portion of said photoelectric converting means, and deciding the amount of image shake on the basis of this amount of displacement.

34. An image shake detecting apparatus according to claim 33, wherein said multiplication type algorithm adds after multiplying a pair of data relatively displaced with each other.

35. An image shake detecting apparatus according to claim 33, wherein said focus detecting means decides said amount of relative displacement on the basis of a difference type algorithm.

36. An image shake detecting apparatus according to claim 33, wherein said difference type algorithm adds the absolute value for a difference of a pair of data relatively displaced.

37. A camera image shake detecting apparatus according to claim 33, wherein said amount of image shake detecting means calculates an amount of image shake per unit time by dividing said amount of image shake by a time interval in occurrence between the previous and the subsequent object image signals.

38. An image shake detecting apparatus according to claim 37, wherein said amount of image shake detecting means calculates the amount of image shake per exposure time by multiplying said amount of image shake per unit time by a shutter speed.

39. An image shake detecting apparatus according to claim 38, further comprising controlling means for controlling the shutter speed so that the amount of image shake per exposure time becomes less than a predetermined value in accordance with said amount of image shake.

40. An image shake detecting apparatus according to claim 33, further comprising alarm means for indicating an alarm in accordance with said amount of image shake.

41. An image shake detecting apparatus according to claim 33, wherein said amount of image shake detecting means calculates said amount of image shake twice or more to output an average value as the amount of image shake.

42. An image shake detecting apparatus according to claim 33, wherein said image shake detecting means detects the amount of image shake by correcting the amount of displacement decided through a multiplication type algorithm on the basis of the amount of relative displacement of the object image resulting from the movement of the lens while the object image signal is generated twice.

* * * * *